US005577045A

United States Patent [19]
Faris et al.

[11] Patent Number: 5,577,045
[45] Date of Patent: Nov. 19, 1996

[54] SELECTIVE CALL RECEIVER FOR RECOVERING GARBLED MESSAGE FRAGMENTS

[75] Inventors: Randi W. Faris, Boca Raton, Fla.; Anselm I. Sequeira, Keller, Tex.; Billy J. Cassily, Boca Raton, Fla.

[73] Assignee: Motorola, Inc., Schaumburg, Ill.

[21] Appl. No.: 516,074

[22] Filed: Aug. 16, 1995

[51] Int. Cl.⁶ ................................................. H04J 3/24
[52] U.S. Cl. .......................... 370/94.1; 370/13; 370/99; 340/825.44
[58] Field of Search .......................... 370/92, 99, 13, 370/94.1; 340/825, 825.07, 825.44

[56] References Cited

U.S. PATENT DOCUMENTS

| | | | |
|---|---|---|---|
| 5,107,259 | 4/1992 | Weitzen et al. | 340/825.44 |
| 5,157,391 | 10/1992 | Weitzen et al. | 340/825.44 |
| 5,311,516 | 5/1994 | Kuznicki et al. | 370/94.1 |

*Primary Examiner*—Douglas W. Olms
*Assistant Examiner*—Matthew C. Phillips
*Attorney, Agent, or Firm*—Philip P. Macnak

[57] ABSTRACT

A selective call receiver is provided that is capable of receiving a transmitted fragmented message and displaying the fragmented message in at least two scripts. The transmitted fragmented message includes a plurality of sequentially ordered message packets each comprising an address and message data, at least one of the message packets having a script select character within the message data. The fragmented message is received by a receiver and passed to a circuit for displaying the fragmented message in the scripts, such that a first portion of the fragmented message is displayed in one of the scripts and a second portion of the fragmented message subsequent to the script select character is displayed in another of the scripts. A retrieval circuit is capable of retrieving a garbled message fragment if a sequentially prior message fragment containing the script select character is missing from the fragmented message. The retrieval circuit preferably includes an error indicator for providing a missing fragment signal indicative of the prior message fragment being missing, and a script select circuit for displaying the garbled message fragment in a selected one of the scripts.

10 Claims, 3 Drawing Sheets

SELECTIVE CALL RECEIVER FOR RECOVERING GARBLED MESSAGE FRAGMENTS

FIELD OF THE INVENTION

This invention relates in general to communication devices, and, more particularly, to a selective call receiver capable of receiving a transmitted fragmented message, displaying the fragmented message in at least first and second scripts, and retrieving a garbled message fragment if a prior message fragment containing a script select character is lost.

BACKGROUND OF THE INVENTION

Selective call receivers, such as, for example pagers, for displaying messages are well known. A selective call receiver typically includes electronic circuits for receiving a transmitted message, for alerting a user that a transmitted message has been received, and for displaying the transmitted message on a display. It has been found that it is more efficient to transmit and receive long messages with communication protocols that use message fragmentation to redistribute traffic over a series of time slots. U.S. Pat. No. 5,311,516 describes a communication system including a selective call receiver that is capable of receiving a plurality of message packets of a transmitted fragmented message, wherein each message packet includes an address and message data. The message data can include an indication of whether more message packets are to be received to complete the fragmented message. The selective call receiver correlates the address of each message packet to a predetermined address, decodes the message data of each message packet, and then successively stores the decoded message data to reconstruct the fragmented message.

Some selective call receivers also have the capability to receive and display a message in any of a variety of scripts. For example, U.S. Pat. No. 5,107,259 describes a selective call receiver that includes a decoder that recognizes a script select character embedded within message data of a received message. A font memory stores fonts corresponding to the scripts. The fonts may include an alphanumeric font requiring a first resolution, for example one byte per character, and an ideographic font requiring a second resolution greater than the first resolution, for example two bytes per character. A controller in the form of a microcomputer is coupled between the font memory and the decoder for selecting one of the fonts in response to the script select character. A display is coupled to the controller for displaying the message in the selected font.

In some cases, a message packet from a fragmented message is lost. Typically, this will mean that a portion of the fragmented message containing the message data from the lost message packet will be missing but that the remainder of the fragmented message can be displayed normally. A more serious problem arises in the case where a fragmented message is received and a message packet containing one or more script select characters is lost. The beginning of the message containing message data from the initial message packets typically will be displayed in the proper font. However, message data from message packets subsequent to the lost message packet may be displayed in a wrong font. This can garble the remainder of the message beyond recognition.

Thus, there is a need for a selective call receiver that is capable of displaying a garbled message fragment of a fragmented message in a readable script.

BRIEF DESCRIPTION OF THE DRAWINGS

FIG. 2 shows examples of the display of a reconstructed fragmented message containing mixed alphanumeric and ideographic fonts.

DESCRIPTION OF THE PREFERRED EMBODIMENT

Figure 1:
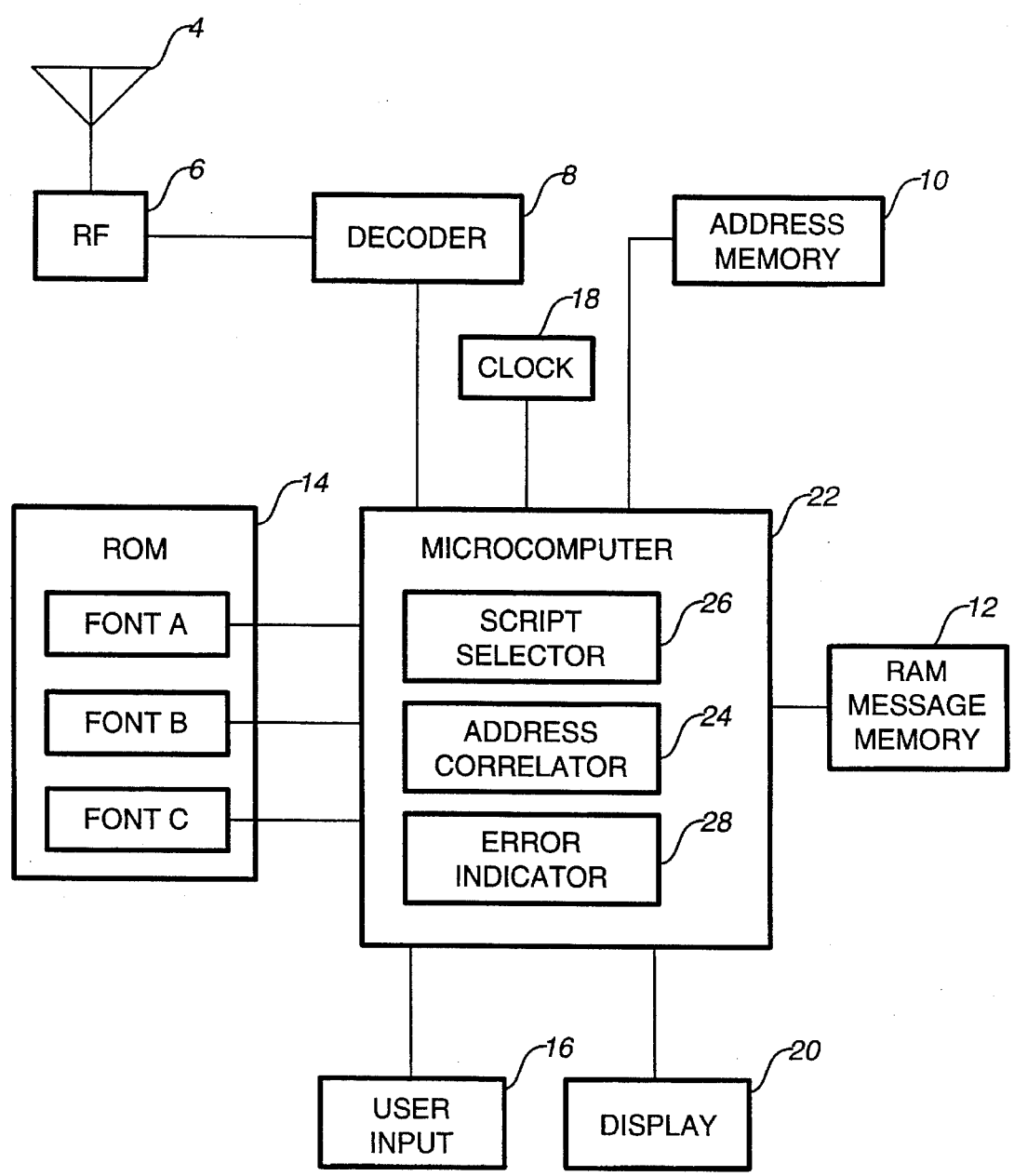
FIG. 1 illustrates a functional block diagram of a typical selective call receiver according to the invention.

FIG. 1 is a functional block diagram of a selective call receiver, popularly referred to as a pager 2, that is capable of receiving a transmitted fragmented message and displaying the fragmented message in at least first and second scripts. The fragmented message includes one or more message packets each having an address and message data, wherein at least one of the message packets includes a script select character within the message data for indicating a change in the script used for display of the fragmented message.

The pager 2 includes an antenna 4 that is coupled to a receiver module 6 which is then coupled to a decoder circuit 8. The pager 2 also includes an address memory 10 for storing one or more predetermined addresses, a message memory 12 for storing the message data of the message packets, a font memory 14 for storing first and second fonts corresponding to the first and second scripts, respectively, a user interface 16 capable of providing a switch signal, a clock circuit 18, and a display 20 for displaying the fragmented message in the fonts. Each of decoder circuit 8, address memory 10, message memory 12, font memory 14, user interface 16, clock circuit, and display 20 are coupled to a programmable controller 22, preferably implemented using an MC68HC05HC11 microcomputer, such as manufactured by Motorola, Inc., or an equivalent microcomputer. The clock circuit 18 provides a clock signal to the controller 22 for controlling its internal operations as well as its interface with other elements of the pager 2 in a manner well known in the art.

The message packets of the fragmented signal are received sequentially by antenna 4 in the form of RF carrier signals. Each RF carrier signal corresponding to each message packet is mixed in receiver module 6 with a local oscillator and an injection signal in a manner well known to those skilled in the art to generate a lower frequency IF signal. Decoder circuit 8 converts the IF signal to the address and message data components of each message packet of the fragmented message. The address and message data are applied to an input of controller 22, which includes an address correlator 24, preferably in the form of a programmed logic or alternatively its circuit equivalent, for correlating the address of each of the message packets to one or more predetermined addresses that are stored in address memory 10. The controller 24 functions to store the message data of each of the message packets in the message memory 12 for reconstructing the fragmented message in a well known manner.

The display 20 can be a dot matrix liquid crystal display having, for example, 16×132 pixels. Font memory 14 stores two or more fonts. In the example illustrated in FIG. 1, Font A is an alphanumeric font requiring 5×7 pixels per character, Font B is a second alphanumeric font requiring 16×16 pixels per character, and Font C is an ideographic font also requiring 16×16 pixels to display each character. Messages can be in a single script requiring only one of the fonts, or can contain mixed alphanumeric and ideographic characters requiring one or more changes in the display font in the course of displaying the message. Such font changes can be signaled within a message data by embedding a script control character therein. For example, "<" can be used to indicate that font A should be used, "^38" can be used to indicate that font B should be used, and ">" can be used to indicate that font C should be used.

Figure 2A:
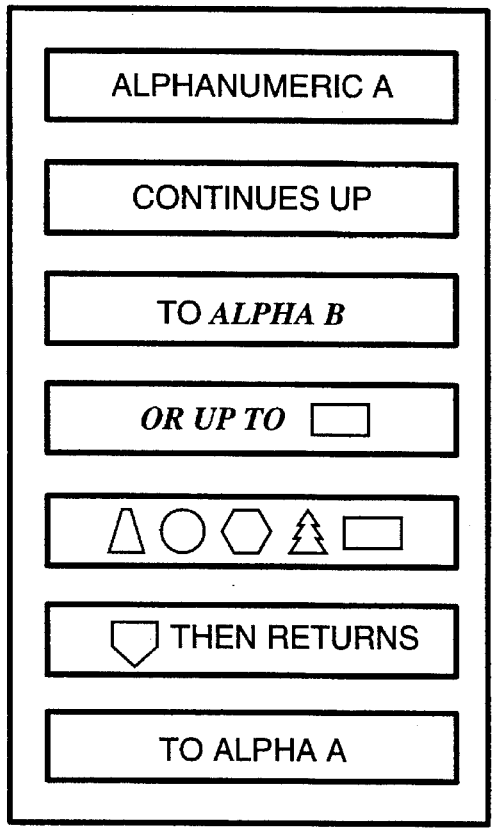
FIG. 2A shows a complete message and FIG. 2B shows a message wherein the message data of the last message packet is garbled because the preceding message packet containing a script control character was lost.

The controller 26 includes a script selector 26 that is capable of recognizing a script control character in a message data component of a message packet and switching the display font in response to a script control character. In one possible mode of operation, one font, for example Font A, is a default font at the start of each message. Alternatively, each message starts with one of the script control characters to be used initially for display of the message. When the script selector 26 recognizes a script control character in the message, the font is changed. FIG. 2A shows a sequence of display screens where a fragmented message is sent in a sequentially ordered series of message packets that contain the following message data:

"<ALPHANUMERIC A", "CONTINUES UP", "TO ^ALPHA B", "OR UP", "TO> ▢ Δ ○ ◇ ⚐," "▢ ⌀< THEN RETURNS", and "TO ALPHA A".

In this example, Font A is an alphanumeric font of 5×7 characters, Font B is an alphanumeric font of 16×16 characters, and Font C is a symbolic font of 16×16 characters.

Figure 2B:
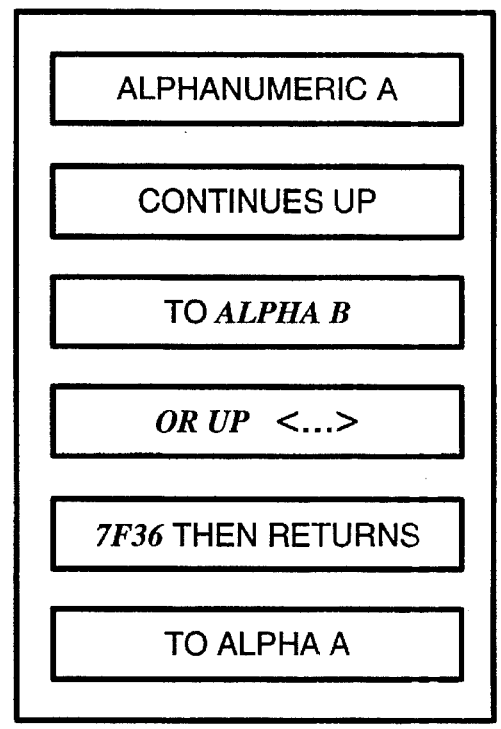

A problem arises where a message packet containing a script control character is lost. In FIG. 2B, the fifth message packet containing a control character to change from the alphanumeric font back to a symbolic font is missing. Because a script control character was lost, the message in the sixth message packet is therefore garbled when displayed.

The hexadecimal representation of the alphanumeric font is as follows, with respect to the message displayed in FIG. 2A:

| Character | Hexadecimal Representation |
| --- | --- |
| 1 | $31 |
| 2 | $32 |
| 3 | $33 |
| 4 | $34 |
| 5 | $35 |
| 6 | $36 |
| 7 | $37 |
| A | $41 |
| B | $42 |
| C | $43 |
| D | $44 |
| E | $45 |
| F | $46 |

The hexadecimal representation of the symbolic font is as follows, with respect to the message displayed in FIG. 2A:

| Character | Hexadecimal Representation |
| --- | --- |
| ▢ | $3746 |
| ▽ | $3336 |

Thus, when the problem described above arises and the message packet containing a control character to change from the symbolic font back to an alphanumeric font is missing, the message is displayed as "7F36" instead of "▢ ▽".

Figure 2C:
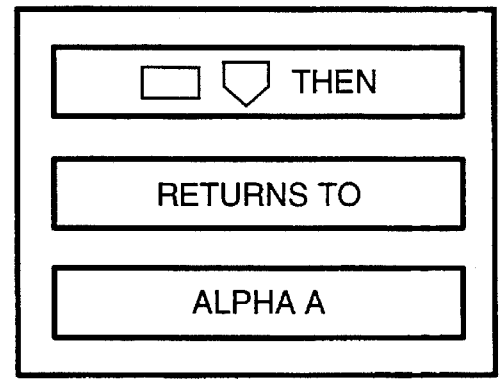
FIG. 2C shows the message wherein the situation illustrated in FIG. 2B arises and the user presses the rescan button.
Figure 3:
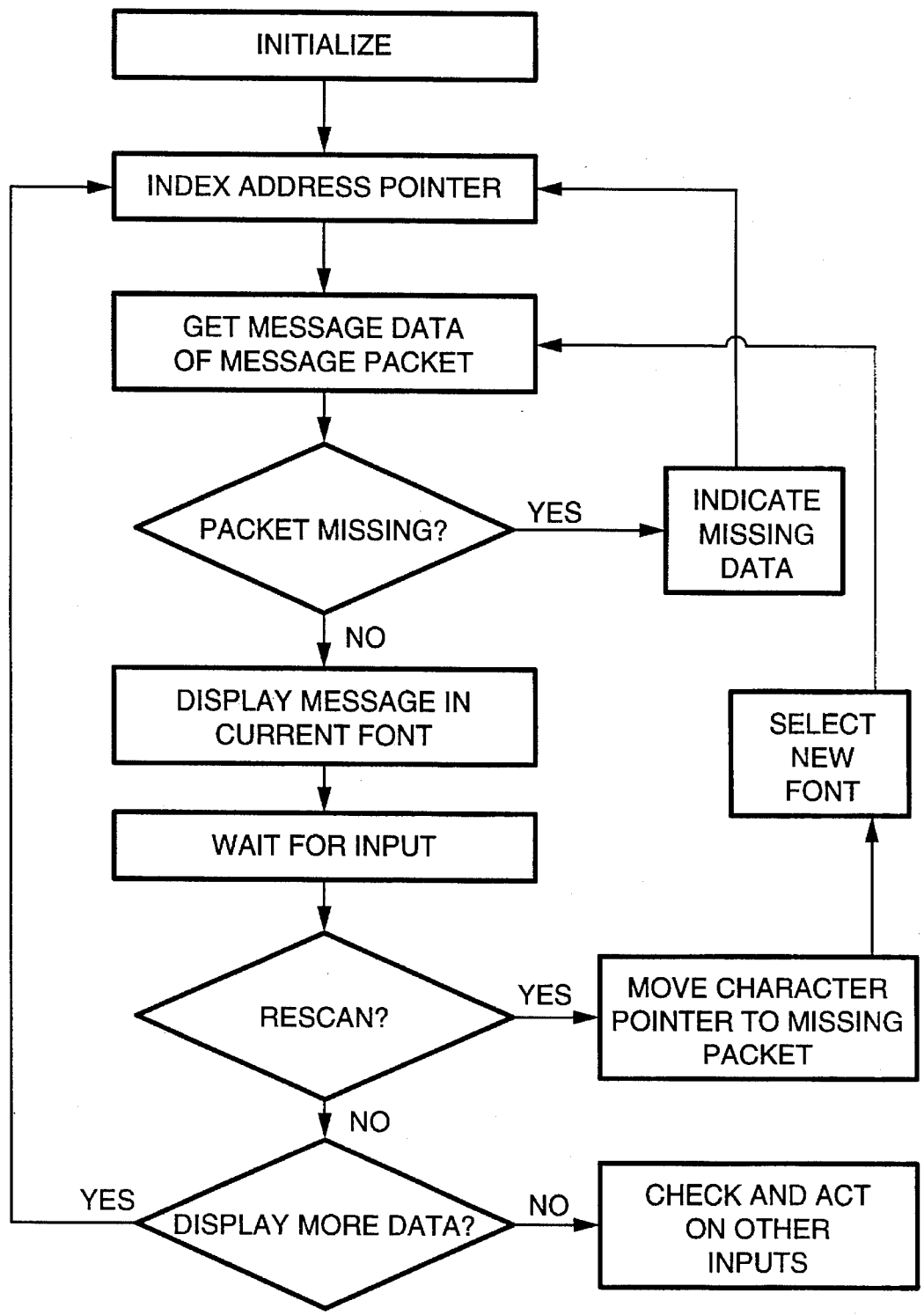
FIG. 3 is a flow chart illustrating a method of operation of the selective call receiver.

In FIG. 2C, the user chooses to rescan the message data of the missing message packet in a newly selected font, discussed in connection with FIG. 3, and the correct message data is displayed. Referring now also to the flow chart illustrated in FIG. 3, display of a fragmented message with the pager 2 of the invention can begin by initializing the pager 2 in a manner well known in the art. This typically includes setting an address pointer. A first message data from a first message packet is retrieved from message memory. An error indicator 28 determines if a message packet is missing. If the message packet is not missing, the message data is output to the display in a font that is either a default font or a font indicated by a script control character at the beginning of the message data. If a message packet is missing, error indicator 28 provides a missing fragment signal indicative of the message fragment being missing. An error message, for example "<. . .>" as shown in FIG. 2B, is output to the display to indicate to the user that a message packet is missing. The pager 2 may also include circuitry for indicating that one or more characters of a message packet are missing.

If the message data displayed is readable, then more message data can be displayed. The address pointer is indexed and the sequence is repeated. Alternatively, the user can choose to rescan the message data of the missing message packet in a newly selected font. If the displayed message data is garbled, such as in the case where a prior message packet containing a script control character is missing, or in the case where one or more characters including a script control character is missing from one of the message data, the user can input a switch signal from the user interface 16 for selecting a different one of the first, second, and third fonts. The script selector circuit 26 outputs the message data to be redisplayed in the newly selected font.

It will be appreciated that there has been provided a selective call receiver capable of receiving a transmitted fragmented message and displaying the fragmented message in more than one script, and further capable of displaying in readable form a portion of the .fragmented message subsequent to a lost message fragment that contained a script control character.

Whereas particular embodiments of the present invention have been described hereinbefore for purposes of illustration, it will be appreciated by those skilled in the art that numerous variations of the details may be made without departing from the invention. Reference therefore should be made to the appended claims rather than to the foregoing discussion of preferred examples in order to assess the scope of the invention in which exclusive rights are claimed.

What is claimed is:

1. A selective call receiver capable of receiving a transmitted fragmented message and displaying the fragmented message in at least first and second scripts, the fragmented message including a plurality of message packets each comprising an address and message data, at least one of said message packets including a script select character within said message data, the selective call receiver comprising:

a receiver for receiving the fragmented message;

an address memory for storing one or more predetermined addresses;

a message memory for storing the message data of the message packets;

a font memory for storing first and second fonts corresponding to the first and second scripts, respectively;

an address correlator coupled to said receiver and the address memory for correlating the address of each of the message packets to the one or more predetermined addresses;

decoder means coupled to the receiver, the address correlator and the message memory for decoding the message data of each of the message packets, including recognizing the script select character, and coupling the message data to the message memory, the message data of each of the message packets being stored in the message memory for reconstructing the fragmented message;

a user input including means to input a script switch signal;

control means coupled to the decoding means and the font memory for selecting one of the fonts in response to the script select character or the script switch signal, and for providing an error signal indicative of one of the message packets being missing; and display means coupled to the control means and the message memory for displaying the fragmented message in the fonts.

2. The selective call receiver of claim 1, wherein the first and second fonts have different resolutions.

3. A selective call receiver capable of receiving a transmitted fragmented message and displaying the fragmented message in at least first and second scripts, the fragmented message including a plurality of message packets each comprising an address and message data to be displayed, the selective call receiver comprising:

a receiver for receiving the fragmented message;

an address memory for storing one or more predetermined addresses;

a message memory for storing the message data of the message packets;

a font memory for storing first and second fonts corresponding to the first and second scripts, respectively;

an address correlator coupled to said receiver and the address memory for correlating the address of each of the message packets to the one or more predetermined addresses;

decoding means coupled to the receiver, the address correlator and the message memory for decoding the message data of each of the message packets, for recognizing a first script select character and a second script select character within the message data of one or more of the message packets, and coupling the message data to the message memory, the message data of each of the message packets being stored in the message memory for reconstructing the fragmented message;

a user interface including means to input a switch signal;

control means coupled to the decoding means and the font memory for determining a selected font, the selected font being the first font in response to the first script select character, the selected font being the second font in response to the second script select character, and the selected font being changed in response to the switch signal, and for providing an error signal indicative of one of the message packets being missing; and display means coupled to the control means and the message memory for displaying the fragmented message in the selected font.

4. The selective call receiver of claim 3, wherein the first and second fonts have different resolutions.

5. The selective call receiver of claim 4, wherein the first font is an alphanumeric font and the second font is an ideographic font.

6. A selective call receiver capable of receiving a transmitted fragmented message and displaying the fragmented message in first, second and third scripts, the fragmented message including a plurality of message packets each comprising an address and message data to be displayed, the selective call receiver comprising:

a receiver for receiving the fragmented message;

an address memory for storing one or more predetermined addresses;

a message memory for storing the message data of the message packets;

a font memory for storing at least two fonts corresponding to the scripts and having different resolutions;

an address correlator coupled to said receiver and the address memory for correlating the address of each of the message packets to the one or more predetermined addresses;

decoding means coupled to the receiver, the address correlator and the message memory for decoding the message data of each of the message packets, for recognizing first, second and third script select characters within the message data of one or more of the message packets, and coupling the message data to the message memory, the message data of each of the message packets being stored in the message memory for reconstructing the fragmented message;

a user interface including means to input a switch signal for selecting one of the first second and third fonts for a displayed portion of the fragmented message;

control means coupled to the decoding means and the font memory for determining a selected font, the selected font being the first font in response to the first script select character, the selected font being the second font in response to the second script select character, and the selected font being changed in response to the switch signal, and for providing an error signal indicative of one of the message packets being missing; and display means coupled to the control means and the message memory for displaying the fragmented message in the selected font.

7. The selective call receiver of claim 6, wherein the first and second fonts have different resolutions.

8. A selective call receiver comprising:

a receiver for receiving the transmitted fragmented message, the fragmented message including a plurality of sequentially ordered message packets each comprising an address and message data, at least one of said message packets including a script select character within said message data;

means for displaying the fragmented message in a plurality of scripts, such that a first portion of the fragmented message is displayed in one of the scripts and a second portion of the fragmented message subsequent to the script select character is displayed in another of the scripts; and means for retrieving a garbled message fragment if a sequentially prior message fragment containing the script select character is missing from the fragmented message.

9. The selective call receiver of claim 8, wherein the retrieving means includes error indicator means for providing a missing fragment signal indicative of the prior message fragment being missing.

10. The selective call receiver of claim 9, wherein the retrieving means includes script select means for displaying the garbled message fragment in a selected one of the scripts.

* * * * *